United States Patent [19]

Greene et al.

[11] Patent Number: 4,609,004
[45] Date of Patent: Sep. 2, 1986

[54] AIRCRAFT SAFETY FUEL TANK

[76] Inventors: Archibald L. Greene; Gary L. Greene; George Spector, all of 233 Broadway, RM 3615, New York, N.Y. 10007

[21] Appl. No.: 636,131

[22] Filed: Jul. 30, 1984

[51] Int. Cl.$^4$ .............................................. F16K 17/36
[52] U.S. Cl. ..................................... 137/38; 137/322; 141/349; 244/135 R; 251/149.6; 251/149.7; 220/900
[58] Field of Search .................. 137/38, 322; 141/348, 141/349, 350; 220/900; 244/135 R; 251/144, 149.6, 149.7

[56] References Cited

U.S. PATENT DOCUMENTS

| 1,810,366 | 6/1931 | Martin | 141/349 X |
| 2,428,527 | 10/1947 | Plumb | 220/900 X |
| 2,461,096 | 2/1949 | Wagner | 220/900 X |
| 2,630,131 | 3/1953 | Snyder | 137/322 |
| 3,170,667 | 2/1965 | Szohatzky | 251/149.6 |
| 3,538,950 | 11/1970 | Porteners | 251/149.6 X |
| 3,574,314 | 4/1971 | Quercia | 141/349 |
| 3,622,035 | 11/1971 | Suter | 220/900 X |
| 4,323,094 | 4/1982 | Paulis | 244/135 R X |

FOREIGN PATENT DOCUMENTS 316117 7/1929 United Kingdom ............... 220/900

Primary Examiner—Robert G. Nilson

[57] ABSTRACT

An aircraft safety fuel tank is provided and consists of a safety seal fuel filler neck secured to an inlet opening of a housing, a quick coupling engine fuel line holder secured to an outlet opening of the housing, a protective covering wrapped around the housing and at least one strap for supporting the tank to the aircraft.

2 Claims, 3 Drawing Figures

AIRCRAFT SAFETY FUEL TANK

BACKGROUND OF THE INVENTION

The instant invention relates generally to aircraft fuel containers and more specifically it relates to an aircraft safety fuel tank.

Numerous aircraft fuel containers have been provided in prior art that are adapted to store gasoline and the like. For example U.S. Pat. Nos. 2,041,450; 2,754,992 and 3,035,797 all are illustrative of such prior art. While these units may be suitable for the particular purpose to which they address, they would not be suitable for the purposes of the present invention as heretofore described.

SUMMARY OF THE INVENTION

A principle object of the present invention is to provide an aircraft safety fuel tank that has a quick coupling engine fuel line holder which will prevent leakage of fuel on impact of the aircraft if the fuel line disengages from the tank.

Another object is to provide an aircraft safety fuel tank that has a safety seal fuel filler neck which will prevent leakage of fuel when the tank is in an inverted position.

An additional object is to provide an aircraft safety fuel tank that has a protective covering wrapped around it and a strap for supporting the tank to the aircraft.

A further object is to provide an aircraft safety fuel tank that is simple and easy to use.

A still further object is to provide an aircraft safety fuel that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
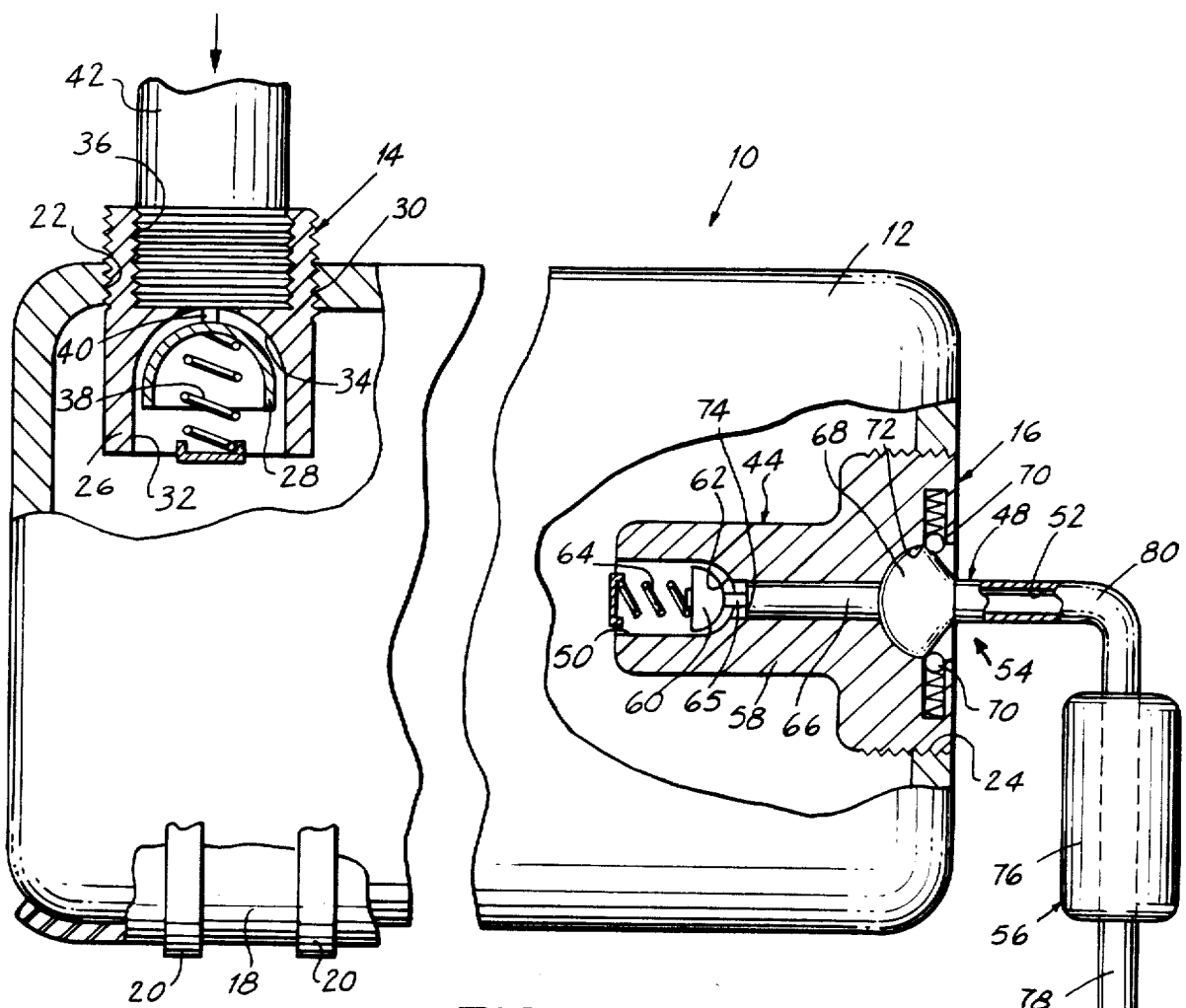
FIG. 1 is a plan view of the invention with parts broken away.

Turning now descriptively to the drawings, in which similar reference characters denote similar elements throughout the several views, FIG. 1 illustrates an aircraft safety fuel tank 10 that consists of a housing 12, a safety seal fuel filler neck 14, a quick coupling engine fuel line holder 16, a protective covering 18 and straps 20.

The housing 12 has a top wall inlet opening 22 and a front wall outlet opening 24. The safety seal fuel filler neck 14 is secured to the inlet opening 22 of the housing while the quick coupling engine fuel line holder 16 is secured to the outlet opening 24 of the housing. The protective covering 18 is wrapped around the housing 12 while the straps 20 are for supporting the tank 10 to the aircraft (not shown).

The safety seal fuel filler neck 14 consists of a sleeve 26 and a stopper 28. The sleeve 26 is threadably secured at 30 to the inlet opening 22 of the housing 12. The sleeve has a passage 32, a seat 34 within the passage and an internally threaded wall 36 within the passage 32 above the seat 34.

The stopper 28 is spring biased with spring 38 and has a bar 40 projecting from its top. The stopper 28 is normally biased up against the seat 34 within the passage 32 of the sleeve 26 sealing the passage thus preventing leakage of fuel when the tank 10 is in an inverted position. When a fuel hose 42 engages the threaded internal wall 36 of the passage 32 of the sleeve 26 it will press down the bar 40 of the stopper 28 opening the passage thus allowing fuel to enter the housing 12 from the fuel hose.

The protective covering 18 consists of six layers of steel cord and rubber material forming a puncture proof coating around the housing 12 similar to a puncture proof tire.

The quick coupling engine fuel line holder 16 consits of a female member 44 and a male member 48. The female member has a sealable fluid passage 50 therethrough. The female member 44 is threadably secured to the outlet opening 24 of the housing 12. The male member 48 has a fluid passage 52 therethrough. The male member mates with the female member 44.

A device 54 is provided for holding the male member 48 within the female member 44 for opening the fluid passage 50 of the female member thus allowing fuel to travel to engine (not shown).

A device 56 is also provided for releasing the male member 48 from the female member 44 for closing the fluid passage 50 of the female member thus preventing leakage of fuel on impact of the aircraft.

The female member 44 consists of a sleeve 58 and a stopper 60. The sleeve 58 is threadably secured to the outlet opening 24 of the housing 12. The sleeve has a passage 50 and a seat 62 within the passage.

The stopper 60 is spring biased with spring 64 and has a bar 65 projecting from its top. The stopper 60 is normally biased toward the seat 62 within the passage 50 of the sleeve 58.

The male member 48 is a hollow tube 66. The device 54 is a cam 68 affixed to the hollow tube 66 and two spring biased balls 70,70. Each spring biased ball is mounted transversely and opposite from the other, within a wide passage portion 72 of the sleeve 58 of the female member 44. The balls 70, 70 engage and hold the cam 68 in position when the hollow tube 66 is inserted within the passage 50 of the sleeve 58 of the female member 44. The end 74 of the hollow tube 66 will press back the bar 65 of the stopper 60 of the female member 44, opening the passage 50 thus allowing the fuel to travel to the engine.

The device 56 consists of a weight 76 affixed to an outwardly extending portion 78 bent at ninety degrees at 80 of the hollow tube 66 of the male member 48.

Figure 2:
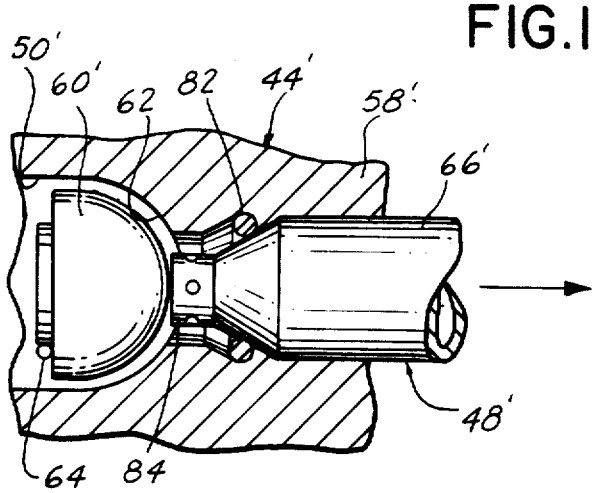
FIG. 2 is a partial cross sectional view of a first modification showing a conical end on fuel line that engages the stopper therein.

FIG. 2 shows a first modification within the female member 44'. An O-ring 82 is mounted within the passage 50' of the sleeve 58' on other side of the seat 62 opposite the stopper 60'. In this modification the stopper 60' does not have the bar 65. The male member 48' is a hollow tube 66' that has a perforated tapered end 84.

The tapered end of the hollow tube will press back the stopper 60' of the female member 44' and engage the O-ring 82 opening the passage 50' thus allowing the fuel to travel to the engine.

Figure 3:
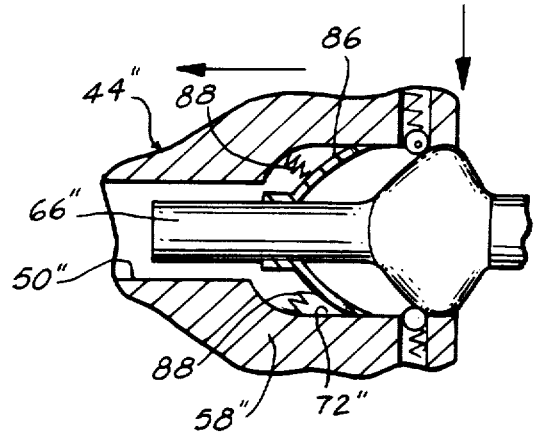
FIG. 3 is a partial cross sectional view of a second modification showing a gasket member therein and the engine fuel line being coupled to the tank.

FIG. 3 shows a second modification within the female member 44". A gasket member 86 spring biased at springs 88, 88 is mounted within the wide portion 72" of the passage 50" of the sleeve 58" of the female member to engage the hollow tube 66". When the hollow tube is inserted within the passage 50" of the sleeve 58" the gasket member 86 will increase the sealing capabilities of the female member 44".

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An aircraft safety fuel tank which comprises:
   (a) a housing having a top wall inlet opening and a front wall outlet opening;
   (b) a safety seal fuel filler neck secured to the inlet opening of said housing;
   (c) a quick coupling engine fuel line holder secured to the outlet opening of said housing;
   (d) a protective covering wrapped around said housing; and
   (e) at least one strap for supporting said tank to the aircraft, wherein said safety seal fuel filler neck comprises:
   (f) a sleeve threadably secured to the inlet opening of said housing, said sleeve having a passage, a seat within the passage and an internally threaded wall within the passage above the seat; and
   (g) a spring biased stopper having a bar projecting from its top, said stopper normally biased up against the seat within the passage of said sleeve sealing the passage thus preventing leakage of fuel when said tank is in an inverted position, when a fuel hose engages the threaded internal wall of the passage of said sleeve it will press down the bar of said stopper opening the passage, thus allowing fuel to enter said housing from the fuel hose, wherein said protective covering comprises multi layers of steel cord and rubber material forming a puncture proof coating around said housing, wherein said quick coupling engine fuel line holder comprises:
   (h) a female member having a sealable fluid passage therethrough, said female member threadably secured to the outlet opening of said housing;
   (i) a male member having a fluid passage therethrough, said male member mates with said female member;
   (j) means for holding said male member within said female member for opening the fluid passage of said female member thus allowing fuel to travel to engine; and
   (k) means for releasing said male member from said female member for closing the fluid passage of said female member thus preventing leakage of fuel on impact of the aircraft, wherein said female member comprises:
   (l) a sleeve threadably secured to the outlet opening of said housing, said sleeve having a passage and a seat within the passage; and
   (m) a spring biased stopper having a bar projecting from its top, said stopper normally biased toward the seat within the passage of said sleeve wherein said male member is a hollow tube wherein said means for holding said male member within said female member for opening the fluid passage of said female member thus allowing fuel to travel to engine comprises:
   (n) a cam affixed to said hollow tube; and
   (o) a spring biased ball mounted transversely within a wide passage portion of said sleeve of said female member, said ball engages and holds said cam in position when said hollow tube is inserted within the passage of said sleeve of said female member so that end of said hollow tube will press back the bar of said stopper of said female member, opening the passage thus allowing the fuel to travel to the engine, wherein said means for releasing said male member from said female member for closing the fluid passage of said female member thus preventing leakage of fuel on impact of the aircraft comprises a weight affixed to an outwardly extending portion bent at ninety degrees, of said hollow tube of said male member.

2. An aircraft safety fuel tank as recited in claim 1, that further comprises a spring biased gasket member mounted within the wide portion of the passage of said sleeve of said female member to engage said hollow tube when said hollow tube is inserted within the passage of said sleeve increasing the sealing capabilities of said female member.

* * * * *